Patented May 6, 1947

2,420,271

UNITED STATES PATENT OFFICE 2,420,271

INSECT REPELLENT COMPOSITION

Bernard V. Travis and Howard A. Jones, Orlando, Fla.; dedicated to the free use of the People in the territory of the United States No Drawing. Application May 18, 1944, Serial No. 536,110

2 Claims. (Cl. 167—30)

(Granted under the act of March 3, 1883, as amended April 30, 1928; 370 O. G. 757)

This application is made under the act of March 3, 1883, as amended by the act of April 30, 1928, and the invention herein described, if patented, may be manufactured and used by or for the Government of the United States of America for governmental purposes without the payment to us of any royalty thereon.

We hereby dedicate the invention herein described to the free use of the people in the territory of the United States to take effect on the granting of a patent to us.

This invention relates to an improved insect repellent composition, and has among its objects the provision of such composition which is effective and long-lasting when applied to the skin.

Many liquid repellents are known which, when applied to the skin, will repel insects for varying lengths of time. These repellents are, however, limited in the length of time they will protect, since they are subject to absorption by the skin and to being readily rubbed off.

According to this invention, it has been found that a composition comprising a liquid repellent incorporated in powdered zinc oxide gives much longer repellency to insects than would be expected from the amount of repellent contained in the composition. In fact, the length of time the composition will protect against biting insects is actually greater than that afforded by an amount of the liquid repellent equal to that of the whole composition. Also, this composition is not as easily rubbed off as is a corresponding liquid preparation when used alone. It adheres to the skin well and after a short time has no oily appearance or feeling. The composition is therefore particularly useful in protecting men in movement through insect-infested areas.

The proportion found most suitable for use is approximately 1 part by weight of the liquid repellent incorporated in about 1 part by weight of the powdered zinc oxide. These amounts give a cream or paste-like composition. With most of the liquid repellents tested, the composition has excellent physical properties for application to the skin. With a few liquid repellents, there is a slight tendency toward separation of liquid on long standing. In such cases, however, the addition of a small proportion of calcium stearate or other metallic stearate stabilizes the composition without in any way affecting its repellency.

The composition is preferably prepared by adding powdered zinc oxide to the liquid repellent slowly with suitable mixing. When all the zinc oxide has been added, the composition may be further mixed with a spatula on a glass plate, ground in a mortar, or by other suitable means made into a homogeneous mixture.

The following formulas will serve to illustrate some examples of the composition:

*Formula 1*

| | Parts by weight |
|---|---|
| Dimethyl phthalate | 1 |
| Zinc oxide | 1 |

*Formula 2*

| | Parts by weight |
|---|---|
| Dimethyl phthalate | 36 |
| 2-ethyl-1,3-hexanediol | 9 |
| Calcium stearate | 3 |
| Zinc oxide | 52 |

*Formula 3*

| | Parts by weight |
|---|---|
| p-Iso-propylphenylethyl alcohol | 44 |
| Zinc oxide | 56 |

The above are cited merely as examples, and it is not to be inferred that other liquid repellents and other proportions cannot be used.

In Formulas 1 and 2, the insect repellent properties of the dimethyl phthalate and the 2-ethyl-1,3-hexanediol are well known. However, in so far as known to the present inventors, the insect repellent properties of the p-iso-propylphenylethyl alcohol of Formula 3 have not heretofore been discovered.

The composition of this invention has been tested by the usual method used in testing insect repellents. This was done by applying ¼ teaspoonful of the material to be tested to the forearm from wrist to elbow and exposing the arm to a large number of hungry mosquitoes or other biting insects. The time elapsing until the first bite was recorded. The results obtained with the three examples of our composition cited above against *Aedes aegypti* and *Anopheles quadrimaculatus* (malaria carrier) are presented in the table in comparison with simultaneous results obtained with the same liquid repellents alone.

*Table*

| | Average repellent time to first bite in minutes | |
|---|---|---|
| | Aedes aegypti | Anopheles Quadrimaculatus |
| Formula No. 1 | 631 | 445 |
| Dimethyl phthalate (alone) | 291 | 194 |
| Formula No. 2 | 583 | 281 |
| 8 parts dimethyl phthalate plus 2 parts 2-ethyl-1,3-hexanediol (alone) | 317 | 154 |
| Formula No. 3 | 361 | 249 |
| p-iso-Propylphenyl ethyl alcohol (alone) | 316 | 108 |

The increase of repellent time afforded by the compositions of this invention is very striking. Even though the compositions contain only about 45 to 50 percent repellent, they afford protection against bites for a much longer period than the repellents alone. Zinc oxide alone has no insect repellent action.

This invention is not limited to the foregoing examples. A number of other liquid repellents and mixtures of repellents have been incorporated in zinc oxide in the same way with similar increases in repellent time. Among these are the ternary solution of 6 parts dimethyl phthalate, 2 parts of 2-ethyl-1,3-hexanediol, and 2 parts of n-butyl mesityl oxide oxalate.

Repellents which are solid or semi-solid at room temperature may also be employed in preparing the composition, by first dissolving them in a repellent or non-repellent liquid and then incorporating the solution in the powdered zinc oxide.

It has also been found that compositions comprising liquid repellents incorporated in powdered calamine and mixtures of calamine and zinc oxide give increased protection against insects, but zinc oxide is preferable.

Although the preferred composition comprises approximately 1 part liquid repellent to 1 part zinc oxide, very satisfactory results have also been obtained with formulas in which 1 part of liquid repellent was incorporated in 3 parts of zinc oxide and in which 3 parts of liquid repellent were incorporated in 1 part of zinc oxide. It is merely preferred that the proportions be such as to give the desired paste-like or creamy consistency to the composition.

Having thus described the invention, what is claimed is:

1. An insect repellent composition comprising p-iso-propylphenylethyl alcohol incorporated in zinc oxide in such amounts as to form a paste-like composition.

2. A method of repelling insects comprising applying p-iso-propylphenylethyl alcohol to the skin.

BERNARD V. TRAVIS.
HOWARD A. JONES.

REFERENCES CITED

The following references are of record in the file of this patent:

UNITED STATES PATENTS

| Number | Name | Date |
| --- | --- | --- |
| 1,931,485 | Caprio et al. | Oct. 24, 1933 |